(12) United States Patent
Mase et al.

(10) Patent No.: US 11,254,321 B2
(45) Date of Patent: Feb. 22, 2022

(54) DRIVING ASSIST APPARATUS

(71) Applicant: TOYOTA JIDOSHA KABUSHIKI KAISHA, Toyota (JP)

(72) Inventors: Yusuke Mase, Nagoya (JP); Hideyuki Usui, Inazawa (JP); Yoshiaki Moriya, Susono (JP); Jiro Ohachi, Shizuoka-ken (JP); Yuki Tomiku, Susono (JP); Yuji Misumi, Toyota (JP); Tetsuhiro Narita, Toyota (JP); Masakatsu Onitsuka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 17/015,181

(22) Filed: Sep. 9, 2020

(65) Prior Publication Data
US 2021/0221383 A1    Jul. 22, 2021

(30) Foreign Application Priority Data
Jan. 20, 2020    (JP) .............................. JP2020-006488

(51) Int. Cl.
*B60W 40/09* (2012.01)
*B60W 40/107* (2012.01)
*B60W 40/08* (2012.01)

(52) U.S. Cl.
CPC .......... *B60W 40/09* (2013.01); *B60W 40/107* (2013.01); *B60W 2040/0827* (2013.01); *B60W 2540/22* (2013.01); *B60W 2540/229* (2020.02); *B60W 2540/26* (2013.01); *B60W 2710/182* (2013.01); *B60W 2720/10* (2013.01)

(58) Field of Classification Search
CPC ............... B60W 40/09; B60W 40/107; B60W 2040/0827; B60W 2540/22; B60W 2540/229; B60W 2540/26; B60W 2710/182; B60W 2720/10;
(Continued)

(56) References Cited

FOREIGN PATENT DOCUMENTS

CN    105946763 A  *  9/2016
CN    106740630 A  *  5/2017
(Continued)

OTHER PUBLICATIONS

English Translation_CN105946763A (Year: 2016).*
English Translation_CN106740630A (Year: 2017).*

*Primary Examiner* — Peter D Nolan
*Assistant Examiner* — Ashley L Redhead, Jr.
(74) *Attorney, Agent, or Firm* — Dickinson Wright, PLLC (57) ABSTRACT

A driving assist apparatus comprises a driver monitor sensor which detects a state of a driver of an own vehicle installed with the driving assist apparatus. The apparatus determines whether the driver is in a drowsy state, based on the state of the driver detected by the driver monitor sensor. The apparatus determines that a light collision occurs when a light collision determination condition that at least one collision index value representing a level of a collision of the own vehicle is larger than a light collision determination threshold at which an airbag is not developed, is satisfied. The apparatus executes a secondary collision damage mitigation control to apply a braking force to the own vehicle or limit a driving force applied to the own vehicle when determining that the driver is in the drowsy state, and the light collision occurs.

9 Claims, 3 Drawing Sheets

(58) Field of Classification Search
CPC ......... B60W 2554/802; B60W 30/085; B60W 2030/082; B60W 30/08; B60W 40/08; B60K 28/14
See application file for complete search history.

(56) References Cited

FOREIGN PATENT DOCUMENTS

| | | | | |
|---|---|---|---|---|
| JP | 2008191784 A | 8/2008 | | |
| JP | 2011043961 A | 3/2011 | | |
| JP | 2016002868 A | 1/2016 | | |
| WO | WO-2015200224 A2 * | 12/2015 | ............ | B60W 40/08 |

* cited by examiner

DRIVING ASSIST APPARATUS

BACKGROUND

Field

The invention relates to a driving assist apparatus which executes a secondary collision damage mitigation control when the driving assist apparatus detects a light collision of an own vehicle.

Description of the Related Art

There is known an apparatus to mitigate a secondary collision damage by an automatic braking when an airbag is developed in response to a detection of a collision of an own vehicle. The secondary collision damage is a damage derived from a situation that the own vehicle collides with an object and further moves to collide with another object.

JP 2016-2868 discloses a vehicle control apparatus which increases a braking force applied to the own vehicle when (i) the vehicle control apparatus detects a light collision of a low collision level which does not cause the airbag to develop, and (ii) an amount of an operation applied to a brake pedal is not enough. The disclosed vehicle control apparatus decreases a driving force applied to the own vehicle, compared to the ordinary situation, by controlling an opening degree of a throttle valve to an opening degree acquired by subtracting a throttle opening degree decreasing amount from the present opening degree of the throttle valve when (i) the disclosed vehicle control apparatus detects the light collision, and (ii) an acceleration pedal is pressed.

When the light collision occurs, a driver of the own vehicle may perform an operation to avoid the secondary collision including mitigating the secondary collision damage. In this case, if a secondary collision damage mitigation control including (i) a braking force control or (ii) a driving force control is executed, the driver may not perform an intended operation to avoid the secondary collision. Therefore, it is difficult to expand a scope which the secondary collision damage mitigation control covers, to a case of the light collision which does not cause the airbag to develop. The disclosed vehicle control apparatus executes the secondary collision damage mitigation control simply in response to detecting the light collision. Thus, the disclosed vehicle control apparatus cannot solve the problems described above.

SUMMARY

The invention has been made for solving problems described above. An object of the invention is to provide a driving assist apparatus having a scope which the secondary collision damage mitigation control covers, expanded to the case of the light collision.

A driving assist apparatus according to the invention comprises (i) a driver monitor sensor which detects a state of a driver of an own vehicle installed with the driving assist apparatus and (ii) an electronic control unit.

The electronic control unit is configured to determine whether the driver is in a drowsy state, based on the state of the driver detected by the driver monitor sensor. The electronic control unit is further configured to determine that a light collision occurs when a light collision determination condition that at least one collision index value representing a level of a collision of the own vehicle is larger than a light collision determination threshold at which an airbag is not developed, is satisfied. The electronic control unit is further configured to execute a secondary collision damage mitigation control to apply a braking force to the own vehicle or limit a driving force applied to the own vehicle when the electronic control unit determines that (i) the driver is in the drowsy state, and (ii) the light collision occurs.

When the driver is in the drowsy state, the driver of the own vehicle may be subject to the collision without noticing. In this case, it may be difficult for the driver to perform a proper operation to avoid a secondary collision including mitigating a secondary collision damage. Under the circumstances, it is desired to take a measure to mitigate the secondary collision damage when a level of a collision is at a level of a light collision which does not cause the airbag to develop.

The driving assist apparatus comprises the driver monitor sensor and the electronic control unit.

The driver monitor sensor detects the state of the driver.

The electronic control unit determines that the light collision occurs when the light collision determination condition that the collision index value representing the level of the collision of the own vehicle is larger than the light collision determination threshold at which the airbag is not developed, is satisfied. In other words, the electronic control unit determines whether the collision index value satisfies the light collision determination condition. When the electronic control unit determines that the collision index value satisfies the light collision determination condition, the electronic control unit determines that the light collision occurs.

The electronic control unit executes the secondary collision damage mitigation control to apply the braking force to the own vehicle or limit the driving force applied to the own vehicle when the electronic control unit determines that (i) the driver is in the drowsy state, and (ii) the light collision occurs. Thereby, a measure to mitigate the secondary collision damage can be taken when the level of the collision is at the level of the light collision which does not cause the airbag to develop while the driver is in the drowsy state and is presumed not to perform an operation to avoid the secondary collision.

Therefore, according to the invention, the scope which the secondary collision damage mitigation control covers, can be expanded to the case of the light collision.

Further, it may be difficult to accurately determine whether the light collision occurs due to a state of a road on which the own vehicle. For example, it may be difficult to accurately determine whether the light collision occurs when the own vehicle moves on a rough road. In this regard, even if the light collision is mistakenly determined to occur when the light collision does not occur, the driver can be alerted by a motion of the own vehicle derived from the secondary collision damage mitigation control.

According to an aspect of the invention, the electronic control unit may be configured to execute the secondary collision damage mitigation control when the electronic control unit determines that the light collision occurs until a predetermined amount of time elapses since the electronic control unit determines that the driver is not in the drowsy state.

For example, the driver may not appropriately recognize a situation surrounding the own vehicle immediately after the driver becomes awake. Therefore, it is difficult for the driver to perform a proper operation to avoid the secondary collision. According to this aspect of the invention, the secondary collision damage mitigation control is executed when the light collision is determined to occur until the predetermined amount of time elapses since the driver is not determined to be in the drowsy state. Therefore, the secondary collision damage mitigation control can be further appropriately executed.

According to another aspect of the invention, the driving assist apparatus may further comprise at least one rear monitor sensor which detects a state behind the own vehicle. In this case, the electronic control unit may be configured to determine whether there is a following vehicle moving behind the own vehicle in a predetermined area near the own vehicle, based on the state behind the own vehicle detected by the rear monitor sensor. Further, the electronic control unit may be configured to apply the braking force to the own vehicle in executing the secondary collision damage mitigation control when the electronic control determines that there is not the following vehicle in the predetermined area near the own vehicle. Furthermore, the electronic control unit may be configured to limit the driving force applied to the own vehicle without applying the braking force to the own vehicle in executing the secondary collision damage mitigation control when the electronic control determines that there is the following vehicle in the predetermined area near the own vehicle.

For example, when (i) an inter-vehicle distance between the own vehicle and the following vehicle is short, and (ii) the secondary collision damage mitigation control is executed to apply the braking force to the own vehicle, the following vehicle may come extremely close to the own vehicle. According to this aspect of the invention, the electronic control unit determines whether there is the following vehicle moving behind the own vehicle in the predetermined area near the own vehicle, based on the state behind the own vehicle detected by the rear monitor sensor. When the electronic control determines that there is not the following vehicle in the predetermined area near the own vehicle, the electronic control unit applies the braking force to the own vehicle in executing the secondary collision damage mitigation control. On the other hand, the electronic control unit limits the driving force applied to the own vehicle without applying the braking force to the own vehicle in executing the secondary collision damage mitigation control when the electronic control determines that there is the following vehicle in the predetermined area near the own vehicle. Therefore, the following vehicle can be prevented from coming extremely close to the own vehicle.

According to further another aspect of the invention, the predetermined area may be set such that an inter-vehicle distance between the own vehicle and the following vehicle in the predetermined area is longer than or equal to a predetermined distance.

According to further another aspect of the invention, the predetermined distance may be set to a distance which increases as a moving speed of the own vehicle increases.

According to further another aspect of the invention, the at least one collision index value may include at least one of (i) an acceleration of a body of the own vehicle and (ii) a value varying, depending on the acceleration.

According to further another aspect of the invention, the at least one collision index value may include at least one of (i) an acceleration of a body of the own vehicle and (ii) an integration value of the acceleration.

According to further another aspect of the invention, the at least one collision index value may include (i) an acceleration of a body of the own vehicle and (ii) an integration value of the acceleration.

According to further another aspect of the invention, the airbag may be developed when the at least one collision index value is larger than an airbag development determination threshold. In this case, the light collision determination threshold may be smaller than the airbag development determination threshold.

Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE EMBODIMENTS

Below, a driving assist apparatus according to an embodiment of the invention will be described with reference to the drawings.

Figure 1:
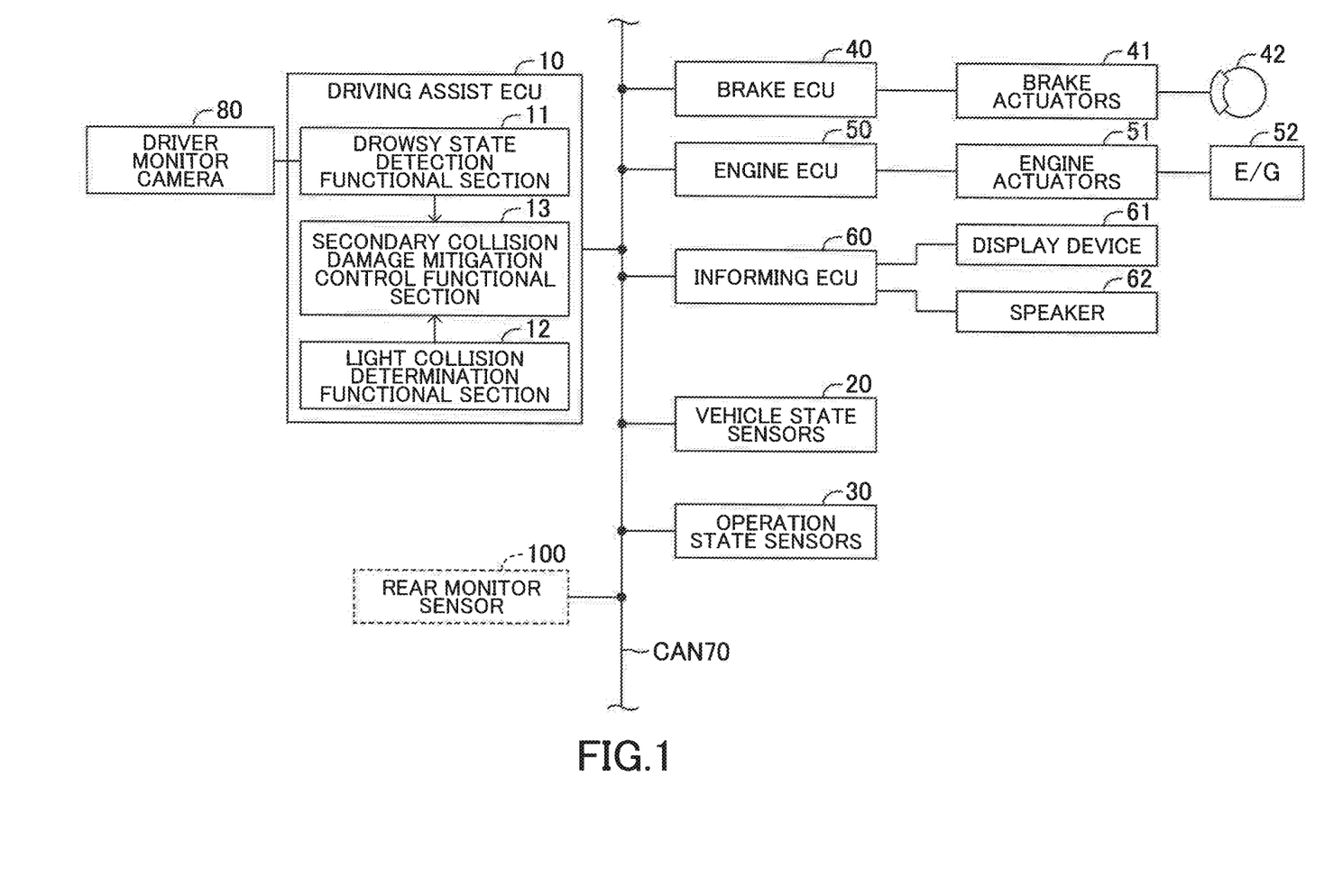
FIG. 1 is a general configuration view which shows a driving assist apparatus according to an embodiment of the invention.

The driving assist apparatus according to the embodiment of the invention is applied to a vehicle. Hereinafter, the vehicle to which the driving assist apparatus according to the embodiment of the invention is applied, will be referred to as "the own vehicle" in order to distinguish the vehicle to which the driving assist apparatus according to the embodiment of the invention is applied, from other vehicles. As shown in FIG. 1, the driving assist apparatus according to the embodiment of the invention includes a driving assist ECU 10, vehicle state sensors 20, operation state sensors 30, a brake ECU 40, an engine ECU 50, and an informing ECU 60.

Each of the ECUs 10, 40, 50, and 60 is an electronic control unit including a micro-computer as a main component. The ECUs 10, 40, 50, and 60 are connected so as to send and receive information to and from each other via a CAN 70 (i.e., Controller Area Network). In this embodiment, the micro-computer includes a CPU, a ROM, a RAM, a non-volatile memory, and an interface I/F. The CPU is configured or programmed to realize various functions by executing instructions, programs, and routines memorized in the ROM.

The driving assist ECU 10 is a main control unit which performs driving assists to a driver of the own vehicle. The driving assist ECU 10 executes a secondary collision damage mitigation control described later in detail. The secondary collision damage mitigation control is a control to apply braking forces to the own vehicle to mitigate a secondary collision damage to the own vehicle when a light collision of the own vehicle is detected while a drowsy state of the driver is being detected. The light collision is a low level collision which does not cause an airbag to develop. In particular, the light collision is a collision including the low level collision which does not cause the airbag to develop. The secondary collision is a collision derived from a situation that the own vehicle collides with an object and further moves to collide with another object. The driving assist ECU 10 may be plural ECUs such as a drowsy state detection ECU and a secondary collision damage mitigation control ECU.

The own vehicle installed with the driving assist apparatus according to the embodiment includes an airbag control apparatus (not shown) which is configured to develop the airbag when the collision having a predetermined level is detected. The airbag control apparatus activates a secondary collision damage mitigation braking at the same time as developing the airbag. In addition to the secondary collision damage mitigation braking performed by the airbag control apparatus, the driving assist apparatus according to the embodiment executes the secondary collision damage mitigation control when the driving assist apparatus detects a particular situation. The particular situation is a situation that the driving assist apparatus detects the light collision of the own vehicle while driving assist apparatus is detecting the drowsy state of the driver. Thereby, a scope which the secondary collision damage mitigation control covers, can be expanded to a case of the light collision.

The driving assist ECU 10 will be described later in detail.

The vehicle state sensors 20 include, for example, a vehicle moving speed sensor, an acceleration sensor, and a yaw rate sensor. The vehicle moving speed sensor detects a moving speed of the own vehicle. The acceleration sensor detects an acceleration in a longitudinal direction of the own vehicle and an acceleration in a lateral direction of the own vehicle. The yaw rate sensor detects a yaw rate of the own vehicle. Sensor information acquired by the vehicle state sensors 20 is provided to the ECUs 10, 40, 50, and 60 via the CAN 70.

The operation state sensors 30 includes sensors and/or switches which detect operations performed by the driver. The operation state sensors 30 includes an acceleration pedal operation amount sensor, a brake pedal operation amount sensor, a brake switch, a steering angle sensor, a steering torque sensor, a blinker switch, and a shift position sensor. The acceleration pedal operation amount sensor detects an amount of an operation applied to an acceleration pedal. The brake pedal operation amount sensor detects an amount of an operation applied to a brake pedal. The brake switch detects an operation applied to the brake pedal. The steering angle sensor detects a steering angle. The steering torque sensor detects a steering torque. The blinker switch detects activations of blinkers. The shift position sensor detects a shift position of a transmission. The sensor information acquired by the operation state sensors 30 is provided to the ECUs 10, 40, 50, and 60 via the CAN 70.

The brake ECU 40 is electrically connected to brake actuators 41. The brake actuators 41 adjust hydraulic pressure of hydraulic friction brake mechanisms 42 provided to left and right front wheels and left and right rear wheels of the own vehicle to generate friction braking forces, depending on the adjusted hydraulic pressure. The brake ECU 40 sets a driver requested deceleration, based on the amount of the operation applied to the brake pedal detected by the brake pedal operation amount sensor. The brake ECU 40 controls activations of the brake actuators 41 to decelerate the own vehicle at the driver requested deceleration. When the brake ECU 40 receives a brake command sent from the driving assist ECU 10, the brake ECU 40 controls the activations of the brake actuators 41 to decelerate the own vehicle at a requested deceleration included in the brake command as information.

The engine ECU 50 is electrically connected to engine actuators 51. The engine actuators 51 change operation states of an internal combustion engine 52. The engine actuators 51 include, for example, a throttle valve actuator which changes an opening degree of a throttle valve. The engine ECU 50 sets a driver requested torque, based on (i) the amount of the operation applied to the acceleration pedal detected by the acceleration pedal operation amount sensor and (ii) the moving speed of the own vehicle detected by the vehicle moving speed sensor. The engine ECU 50 controls activations of the engine actuators 51 to cause the internal combustion engine 52 to output the driver requested torque. When the engine ECU 50 receives a driving force limitation command sent from the driving assist ECU 10, the engine ECU 50 controls the activations of the engine actuators 51 to limit a torque generated by and output from the internal combustion engine 52. When the own vehicle is an electric vehicle, the engine actuators 51 include a driving apparatus of an electric motor. When the own vehicle is a hybrid vehicle, the engine actuators 51 include the engine actuators and the driving apparatus of the electric motor.

The informing ECU 60 is electrically connected to a display device 61 and a speaker 62. The informing ECU 60 can cause the display device 61 to display images indicating the driving assists in accordance with commands sent from the driving assist ECU 10. In addition, the informing ECU 60 can cause the speaker 60 to generate alert sounds such as warning buzzer sounds or voice announcements in accordance with commands sent from the driving assist ECU 10.

Next, the driving assist ECU 10 will be described. The driving assist ECU 10 includes a drowsy state detection functional section 11, a light collision determination functional section 12, and a secondary collision damage mitigation control functional section 13.

Drowsy State Detection Functional Section

A driver monitor camera 80 is electrically connected to the drowsy state detection functional section 11. The driver monitor camera 80 is mounted on a dashboard or a steering column. The driver monitor camera 80 takes images of a face of the driver of the own vehicle and provides the taken images to the drowsy state detection functional section 11.

The drowsy state detection functional section 11 analyzes the images provided from the driver monitor camera 80 to detect an open-and-closed state of eyes of the driver. For example, the drowsy state detection functional section 11 detects positions of upper and lower eye lids of the driver by an image processing to detect opening degrees of the eyes of the driver, based on vertical distances between the upper and lower eye lids. Hereinafter, the opening degree of the eye will be referred to as "the eye opening degree." The drowsy state detection functional section 11 compares the eye opening degrees with a threshold prepared for determining whether the eyes of the driver are open or closed. When the eye opening degrees are larger than or equal to the threshold, the drowsy state detection functional section 11 determines that the eyes of the driver are open. On the other hand, when the eye opening degrees are smaller than the threshold, the drowsy state detection functional section 11 determines that the eyes of the driver are closed. When the drowsy state detection functional section 11 determines that the eyes of the driver have been closed for a predetermined amount of time, the drowsy state detection functional section 11 determines or presumes that the driver is in the drowsy state. On the other hand, when the drowsy state detection functional section 11 detects that the eyes of the driver open while the drowsy state detection functional section 11 is determining that the driver is in the drowsy state, the drowsy state detection functional section 11 determines that the driver is not in the drowsy state.

Methods to presume whether the driver is in the drowsy state are known, for example, from JP 2008-191784 A and JP 2011-43961 A. The known methods can be used in this embodiment.

The drowsy state detection functional section 11 provides a drowsy state detection signal to the secondary collision damage mitigation control functional section 13 and the informing ECU 60 while the drowsy state detection functional section 11 is determining that the driver is in the drowsy state.

The informing ECU 60 activates the speaker 62 to generate the warning buzzer sounds (or the alert sounds) and displays an alert image on the display device 61 while the drowsy state detection signal is sent from the drowsy state detection functional section 11 to the informing ECU 60. Moreover, the informing ECU 60 may vibrate a steering wheel.

Light Collision Determination Functional Section

The light collision determination functional section 12 determines whether the light collision of the own vehicle occurs. The light collision determination functional section 12 has memorized a predetermined light collision determination condition. The light collision determination functional section 12 determines that the light collision occurs when the predetermined light collision determination condition becomes satisfied. When the light collision determination functional section 12 detects the light collision (in particular, the light collision determination functional section 12 determines that the light collision occurs), the light collision determination functional section 12 provides a light collision detection signal to the secondary collision damage mitigation control functional section 13.

The light collision determination functional section 12 determines that the light collision determination condition becomes satisfied when following determination conditions B1 and B2 both become satisfied.

B1: An acceleration of a body of the vehicle is larger than an acceleration threshold.

B2: An integration value of the acceleration of the body of the vehicle is larger than an integration threshold.

The acceleration of the body of the own vehicle is detected by the acceleration sensor. The acceleration sensor outputs signals representing a longitudinal component of the acceleration of the body of the own vehicle and a lateral component of the acceleration of the body of the own vehicle. Hereinafter, the longitudinal component of the acceleration of the body of the own vehicle, will be referred to as "the longitudinal acceleration $Gx$", and the lateral component of the acceleration of the body of the own vehicle, will be referred to as "the lateral acceleration $Gy$." The acceleration of the body of the own vehicle and the integration value of the acceleration are used as collision index values which represent a level of a collision of the own vehicle.

The acceleration detected by the acceleration sensor includes a deceleration (i.e., the negative acceleration). The light collision determination functional section 12 performs calculation processes of the acceleration detected by the acceleration sensor with considering whether the acceleration is positive or negative. The lateral acceleration $Gy$ in one of leftward and rightward directions (for example, in the leftward direction) is represented by a positive value, and the lateral acceleration $Gy$ in the other direction (for example, in the rightward direction) is represented by a negative value. In this description, when a magnitude of the negative acceleration (in particular, a relationship in magnitude between the negative acceleration and the threshold) is referred, an absolute value of the negative acceleration is referred.

In this embodiment, the light collision determination functional section 12 determines whether the light collision of a front side portion of the own vehicle occurs and whether the light collisions of left or right side portions of the own vehicle occur. Hereinafter, the light collision of the front side portion of the own vehicle, will be referred to as "the front collision", and the light collision of the left or right side portion of the own vehicle, will be referred to as "the side collision." The light collision determination functional section 12 determines that the predetermined light collision determination condition becomes satisfied when a determination condition regarding the front collision becomes satisfied or when a determination condition regarding the side collision becomes satisfied.

The determination condition regarding the front collision becomes satisfied when (i) the longitudinal acceleration $Gx$ of the body of the own vehicle (in this case, the deceleration) is larger than an acceleration threshold $Gxth$ for a front collision determination (the determination condition B1), and (ii) an integration value $Vx$ of the longitudinal acceleration $Gx$ of the body of the own vehicle is larger than an integration threshold $Vxth$ for the front collision determination (the determination condition B2). For example, the determination condition regarding the side collision becomes satisfied when (i) a leftward acceleration $Gyl$ of the body of the own vehicle is larger than an acceleration threshold $Gylth$ for a left side collision determination (the determination condition B1), and (ii) an integration value $Vyl$ of the leftward acceleration $Gyl$ of the body of the own vehicle is larger than an integration threshold $Vylth$ for the left side collision determination (the determination condition B2). Further, the determination condition regarding the side collision becomes satisfied when (i) a rightward acceleration $Gyr$ of the body of the own vehicle is larger than an acceleration threshold $Gyrth$ for a right side collision determination (the determination condition B1), and (ii) an integration value $Vyr$ of the rightward acceleration $Gyr$ of the body of the own vehicle is larger than an integration threshold $Vyrth$ for the right side collision determination (the determination condition B2).

The integration value of the acceleration is, for example, an integration value of the acceleration (deceleration) between a start timing and an end timing described below.

The start timing is earlier one of (i) a point of time when a period integration value of the longitudinal acceleration $Gx$ (in particular, the integration value of the longitudinal acceleration $Gx$ in a predetermined period) becomes larger than a longitudinal period integration threshold and (ii) a point of time when a period integration value of the lateral acceleration $Gy$ (in particular, the integration value of the lateral acceleration $Gy$ in the predetermined period) becomes larger than a lateral period integration threshold.

The end timing is earlier one of (i) a point of time when a first predetermined amount of time elapses since a synthesized period integration value acquired by synthesizing the period integration value of the longitudinal acceleration $Gx$ and the period integration value of the lateral acceleration $Gy$ becomes smaller than a synthesized period integration threshold and (ii) a point of time when a second predetermined amount of time (>the first predetermined amount of time) elapses since the start timing.

The light collision determination functional section 12 detects the start timing and the end timing by repeatedly calculating the period integration values with a predetermined calculation cycle.

The acceleration threshold in the determination condition B1 and the integration threshold in the determination condition B2 are lower than values at the level of the collision which causes the airbag control apparatus to develop the airbag. Therefore, an occurrence of the light collision can be determined by using the light collision determination condition.

For example, when the own vehicle moves on a rough road, the acceleration of the own vehicle may instantaneously become larger than the acceleration threshold. Thus, it is difficult to accurately distinguish the light collision from a rough road moving by determining whether the light collision occurs by using the determination condition B1 only. When the light collision occurs, the integration value of the acceleration is large, compared to when the own vehicle moves on the rough road. Accordingly, in this embodiment, using the determination condition B2 can prevent the rough road from influencing determination results of whether the light collision occurs as possible.

In this embodiment, the light collision includes the front collision and the side collision. In this regard, the light collision may include the light collision of a rear side portion of the own vehicle. Hereinafter, the light collision of the rear side portion of the own vehicle, will be referred to as "the rear collision." In this case, the determination condition regarding the rear collision becomes satisfied when (i) the longitudinal acceleration Gx (positive) of the body of the own vehicle is larger than an acceleration threshold Vxrth for a rear collision determination (the determination condition B1), and (ii) the integration value Vx of the longitudinal acceleration Gx (positive) of the body of the own vehicle is larger than an integration threshold Vxrth for the rear collision determination (the determination condition B2). The light collision determination functional section 12 determines that the light collision determination condition becomes satisfied when any of (i) the determination condition for the front collision, (ii) the determination condition for the side collision, and (iii) the determination condition for the rear collision, becomes satisfied.

Secondary Collision Damage Mitigation Control Functional Section

The secondary collision damage mitigation control functional section 13 executes a control to generate the braking force on the own vehicle and limit the driving force to mitigate the secondary collision damage of the own vehicle, i.e. executes the secondary collision damage mitigation control. Hereinafter, the secondary collision damage mitigation control functional section 13 will be referred to as "the SCDM control functional section 13." The term "SCDM" stands for the term "secondary collision damage mitigation."

The SCDM control functional section 13 has a function to determine whether to execute the secondary collision damage mitigation control, based on (i) the drowsy state detection signal provided from the drowsy state detection functional section 11 and (ii) the light collision detection signal provided from the light collision determination functional section 12. Hereinafter, the secondary collision damage mitigation control will be referred to as "the SCDM control."

Figure 2:
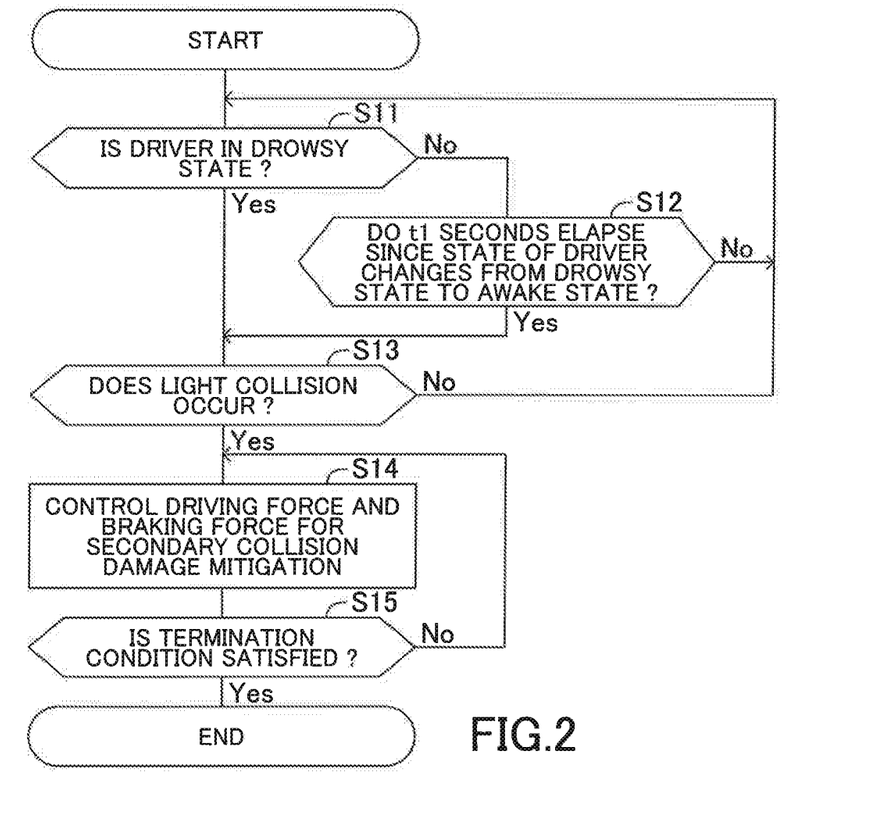
FIG. 2 is a view which shows a flowchart of a secondary collision damage mitigation control routine.

FIG. 2 shows a SCDM control routine executed by the SCDM control functional section 13. The SCDM control functional section 13 starts to execute the SCDM control routine when (i) an ignition switch is turned on, and (ii) an initialization process is finished.

When the SCDM control functional section 13 starts to execute the SCDM control routine, the SCDM control functional section 13 proceeds with the process to a step S11 to determine whether the driver is in the drowsy state. In particular, the SCDM control functional section 13 determines whether the drowsy state detection signal is provided from the drowsy state detection functional section 11 to the SCDM control functional section 13.

When the SCDM control functional section 13 determines that the driver is not in the drowsy state (S11: No), the SCDM control functional section 13 proceeds with the process to a step S12 to determine whether an elapsed amount of time elapsing since a state of the driver changes from the drowsy state to an awake state, is shorter than or equal to a predetermined amount of time (t1 seconds). The SCDM control functional section 13 includes a timer which measures the elapsed amount of time elapsing since the drowsy state detection functional section 11 stops providing the drowsy state detection signal to the SCDM control functional section 13 after the SCDM control functional section 13 is provided with the drowsy state detection signal from the drowsy state detection functional section 11. The SCDM control functional section 13 determines whether the elapsed amount of time measured by the timer is shorter than or equal to the predetermined amount of time (t1 seconds).

When (i) the drowsy state of the driver is not detected, and (ii) the elapsed amount of time elapsing since the state of the driver changes from the drowsy state to the awake state, becomes longer than the predetermined amount of time (t1 seconds), the SCDM control functional section 13 returns the process to the step S11 to execute a process of the step S11 again.

On the other hand, when the drowsy state of the driver is detected (S11: Yes), that is, the drowsy state detection signal is provided from the drowsy state detection functional section 11 to the SCDM control functional section 13 or when the elapsed amount of time elapsing since the state of the driver changes from the drowsy state to the awake state is shorter than or equal to the predetermined amount of time (t1 seconds) (S12: Yes), the SCDM control functional section 13 proceeds with the process to a step S13.

At the step S13, the SCDM control functional section 13 determines whether the light collision occurs. In particular, the SCDM control functional section 13 determines whether the light collision detection signal is provided from the light collision determination functional section 12 to the SCDM control functional section 13. The light collision detection signal is provided from the light collision determination functional section 12 to the SCDM control functional section 13 when the light collision determination condition becomes satisfied.

When the SCDM control functional section 13 determines that the light collision does not occur (S13 No), the SCDM control functional section 13 returns the process to the step S11. Therefore, the SCDM control functional section 13 repeatedly executes a determination process of the step S13 while the drowsy state of the driver is detected, and while the elapsed amount of time elapsing since the state of the driver changes from the drowsy state to the awake state, is shorter than or equal to the predetermined amount of time (t1 seconds).

When the SCDM control functional section 13 determines that the light collision occurs (S13: Yes) while the SCDM control functional section 13 repeatedly executes the processes, the SCDM control functional section 13 proceeds with the process to a step S14 to execute the SCDM control. In this case, the SCDM control functional section 13 sends an SCDM control command to the brake ECU 40. The SCDM control command includes information on a predetermined requested deceleration for a secondary collision damage mitigation. When the brake ECU 40 receives the SCDM control command, the brake ECU 40 controls the activations of the brake actuators to achieve the predetermined requested deceleration for the secondary collision damage mitigation. Thereby, the friction braking forces are applied to the left and right front wheels and the left and right rear wheels of the own vehicle to forcibly decelerate the own vehicle without the operation applied to the brake pedal by the driver.

While the SCDM control functional section 13 executes the SCDM control, the SCDM control functional section 13 sends a driving force limitation command to the engine ECU 50 to limit the torque output from the internal combustion engine (for example, control the torque output from the internal combustion engine to zero or to an output torque for a creep moving). Thereby, the engine ECU 50 controls the activations of the engine actuators 51 to limit the output torque generated by the internal combustion engine. Thereby, even when the driver presses the acceleration pedal, the driver requested torque is overridden. Therefore, the own vehicle is not accelerated in response to the operation applied to the acceleration pedal.

Next, at a step S15, the SCDM control functional section 13 determines whether a termination condition of the SCDM control becomes satisfied. The SCDM control functional section 13 determines that the termination condition of the SCDM control becomes satisfied when at least one of following determination conditions C1, C2, C3, C4, and C5 becomes satisfied (an OR condition becomes satisfied).

C1: The operation applied to the acceleration pedal is detected.

C2: The operation applied to the brake pedal is detected.

C3: A steering operation (or an operation applied to the steering wheel) is detected.

C4: A stop of the own vehicle is detected.

C5: A state that the eyelids of the driver have been open for a predetermined amount of time t2 or more is detected.

For example, the determination condition C1 becomes satisfied when an operation of returning or pressing the acceleration pedal is detected by the acceleration pedal operation amount sensor. For example, the determination condition C2 becomes satisfied when the amount of the operation applied to the brake pedal larger than or equal to a threshold is detected by the brake pedal operation amount sensor. For example, the determination condition C3 becomes satisfied when a changing rate of the steering angle larger than or equal to a threshold is detected by the steering angle sensor. For example, the determination condition C4 becomes satisfied when the vehicle moving speed of zero or smaller than or equal to a vehicle moving speed threshold near zero is detected by the vehicle moving speed sensor. The determination condition C5 becomes satisfied when the drowsy state detection signal has been not provided from the drowsy state detection functional section 11 for the predetermined amount of time t2 or more.

The termination condition of the SCDM control is not limited to the above-described conditions. For example, the termination condition of the SCDM control may include the determination condition C1 only. Moreover, the determination condition C1 may include a condition that the operation of returning the acceleration pedal is detected without a condition that the operation of pressing the acceleration pedal is detected.

When the termination condition of the SCDM control is not satisfied (S15: No), the SCDM control functional section 13 returns the process to the step S14. Thereby, the SCDM control continues to be executed.

When the termination condition of the SCDM control becomes satisfied (S15: Yes), the SCDM control functional section 13 terminates executing the SCDM control routine.

When the driver is in the drowsy state, the own vehicle is likely to collide with an obstacle, compared to the ordinary time. In addition, when the light collision occurs, the driver is subject to the light collision without noticing the obstacle. In this case, it may be difficult for the driver to perform a proper operation to avoid the secondary collision (including mitigating the secondary collision damage). Under the circumstances, it is desired to take a measure to mitigate the secondary collision damage when the level of the collision is at the level of the light collision which does not cause the airbag to develop.

According to this embodiment, the SCDM control is executed when the light collision is detected in response to satisfying (i) a condition that the drowsy state of the driver is detected or (ii) a condition that the elapsed amount of time elapsing since the state of the driver changes from the drowsy state to the awake state, is shorter than or equal to the predetermined amount of time (t1 seconds). Thereby, the secondary collision damage can be appropriately mitigated.

Further, it may be difficult to accurately determine whether the light collision occurs due to a state of a road. For example, it may be difficult to accurately determine whether the light collision occurs when the own vehicle moves on the rough road. In this regard, even if the light collision is mistakenly determined to occur when the light collision does not occur, the driver can be alerted by a motion of the own vehicle derived from the SCDM control.

Further, the drowsy state of the driver is detected by a presumption. It is difficult to accurately detect the drowsy state of the driver. Therefore, the drowsy state of the driver may be mistakenly presumed. In this regard, even if the drowsy state of the driver is mistakenly detected, the SCDM control is executed in response to the occurrence of the light collision. Thus, the SCDM control can be properly executed.

As a result, according to this embodiment, the scope which the SCDM control covers, can be expanded to the case of the light collision. In particular, the SCDM control can be appropriately executed at an early timing before the airbag is developed.

FIRST MODIFIED EXAMPLE

According to the embodiment, the SCDM control executed at the step S14 generates the braking forces to decelerate the own vehicle at the requested deceleration and limits the driving force (for example, the driving force=zero). In this regard, the braking forces are not always needed to be generated. The secondary collision damage may be mitigated only by limiting the driving force. For example, the SCDM control functional section 13 may be configured to send an SCDM command to the engine ECU 50 without sending the SCDM control command to the brake ECU 40 at the step S14. When the engine ECU 50 receives the SCDM command, the engine ECU 50 sets a target torque to a torque acquired by limiting the driver requested torque to a predetermined upper limit torque for the secondary collision damage mitigation or less. The engine ECU 50 controls the activations of the engine actuators 51 to output the target torque. In this case, the predetermined upper limit torque for the secondary collision damage mitigation may be zero.

SECOND MODIFIED EXAMPLE

For example, when (i) an inter-vehicle distance between the own vehicle and a following vehicle is short, and (ii) the SCDM control is executed to generate the braking forces on the own vehicle, the following vehicle may come extremely close to the own vehicle. Accordingly, the driving assist apparatus according to a second modified example of the embodiment of the invention executes the SCDM control to generate the braking forces on the own vehicle when the following vehicle is not detected in an area near the own vehicle. On the other hand, the driving assist apparatus according to the second modified example executes the SCDM control to limit the driving force applied to the own vehicle without generating the braking forces on the own vehicle when the following vehicle is detected in the area near the own vehicle.

As shown by dashed line in FIG. 1, the driving assist apparatus according to the second modified example includes at least one rear monitor sensor 100. The at least one rear monitor sensor 100 detects an object behind the own vehicle. For example, a camera sensor or a radar sensor can be used as the at least one rear monitor sensor 100. The at least one rear monitor sensor 100 according to the second modified example includes both the camera sensor and a millimeter wave radar sensor. The at least one rear monitor sensor 100 synthesizes information provided from the camera sensor and the millimeter wave radar sensor to recognize the object behind the own vehicle. Hereinafter, the recognized object will be referred to as "the target object." Moreover, the at least one rear monitor sensor 100 detects the kind of the target object, a size of the target object, a distance between the target object and the own vehicle, a relative speed of the target object relative to the own vehicle, and a direction of the target object relative to the own vehicle. The at least one rear monitor sensor 100 sends information on the target object to the CAN 70. Thereby, the driving assist ECU 10 can acquire information on the following vehicle.

Figure 3:
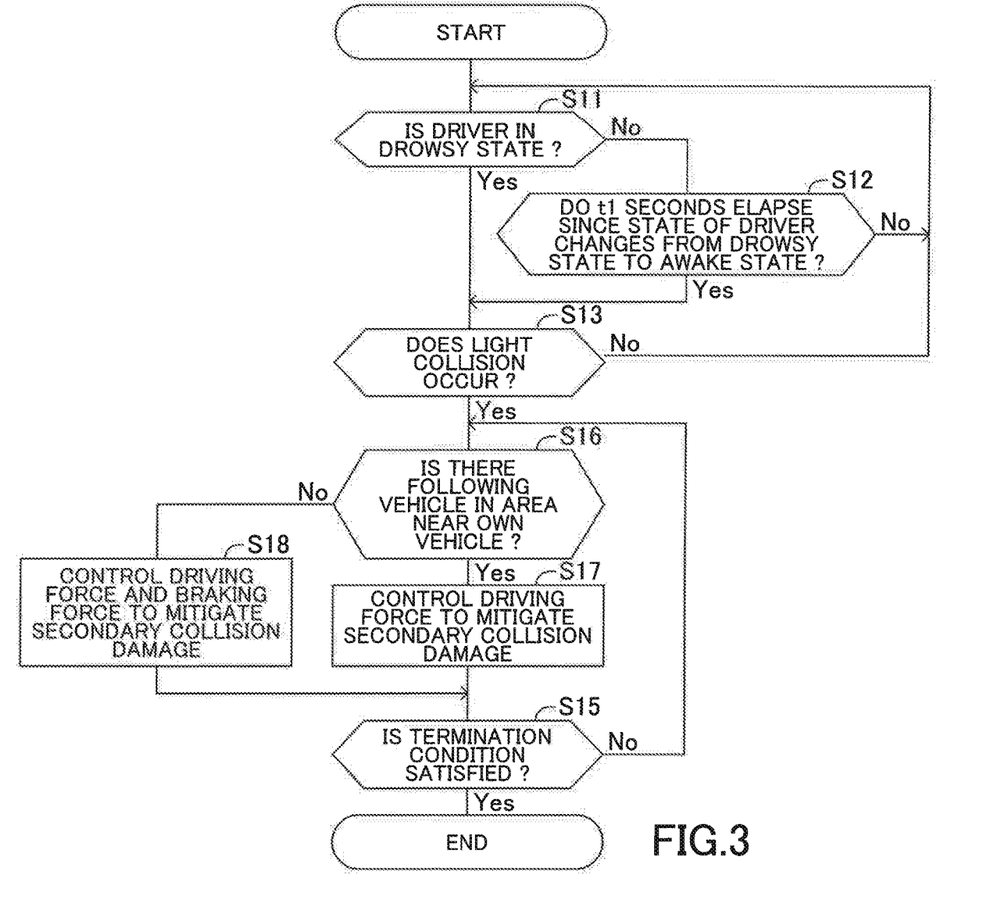
FIG. 3 is a view which shows a flowchart of the secondary collision damage mitigation control routine according to a second modified example of the embodiment of the invention.

FIG. 3 shows the SCDM control routine according to the second modified example. This SCDM control routine includes steps S16 to S18 in place of the step S14 of the SCDM control routine according to the embodiment shown in FIG. 2. Remaining processes of the steps S11 to S13, and S15 are the same as those of processes of the steps S11 to S13, and S15 of the SCDM control routine according to the embodiment, respectively. Below, processes of the SCDM control routine according to the second modified example different from the processes of the SCDM control routine according to the embodiment, will be described.

When the SCDM control functional section 13 determines that the light collision occurs at the step S13 (S13: Yes), the SCDM control functional section 13 proceeds with the process to a step S16. At the step S16, the SCDM control functional section 13 determines whether there is the following vehicle in the area behind and near the own vehicle, based on the information provided from the at least one rear monitor sensor 100. For example, when the following vehicle is in the area behind and near the own vehicle, an inter-vehicle distance between the own vehicle and the following vehicle is shorter than or equal to a predetermined distance. The predetermined distance is a shortest distance which the following vehicle is prevented from coming extremely close to the own vehicle when the SCDM control to generate the braking force on the own vehicle is executed. For example, the predetermined distance may be set so as to increases as the vehicle moving speed detected by the vehicle moving speed sensor increases.

When the SCDM control functional section 13 determines that there is the following vehicle in the area behind and near the own vehicle (S16: Yes), the SCDM control functional section 13 proceeds with the process to a step S17 to execute the SCDM control to limit the driving force applied to the own vehicle without generating the braking force on the own vehicle. In this case, the SCDM control functional section 13 sends the driving force limitation command to limit the torque output from the internal combustion engine to the engine ECU 50 and does not send the SCDM control command to the brake ECU 40.

On the other hand, when the SCDM control functional section 13 determines that there is not the following vehicle behind and near the own vehicle (S16: No), the SCDM control functional section 13 proceeds with the process to a step S18 to send the SCDM control command to the brake ECU 40 and send the driving force limitation command to limit the torque output from the internal combustion engine to the engine ECU 50. A process of the step S18 is the same as the process of the step S14 according to the embodiment.

After the SCDM control functional section 13 executes the process of the step S17 or S18, the SCDM control functional section 13 proceeds with the process to the step S15 to determine whether the termination condition of the SCDM control is satisfied. The SCDM control functional section 13 continues to execute the SCDM control described above until the termination condition of the SCDM control becomes satisfied.

According to the second modified example, the following vehicle can be prevented from coming extremely close to the own vehicle when the SCDM control is executed.

The driving assist apparatuses according to the embodiment and the modified examples thereof have been described. The invention is not limited to the embodiment and the modified examples thereof. Various modifications can be employed without departing from a scope of the invention.

For example, the determination process of the step S12 in the SCDM control routine may be omitted. In this case, only when the drowsy state of the driver is detected, the SCDM control is executed in response to detecting the light collision.

Further, the driving assist apparatuses according to the embodiment and the modified examples thereof may be configured to determine whether to execute the SCDM control routine, based on a request from a user operating a selection switch.

Further, the driving assist apparatus according to the embodiment determines that the light collision determination condition becomes satisfied when the determination conditions B1 and B2 both become satisfied. In this regard, various conditions may be set as the light collision determination condition. For example, the light collision determination condition may include only one of the determination conditions B1 and B2.

What is claimed is:

1. A driving assist apparatus comprising:
a driver monitor sensor which detects a state of a driver of an own vehicle installed with the driving assist apparatus; and
an electronic control unit configured to:
   determine whether the driver is in a drowsy state, based on the state of the driver detected by the driver monitor sensor;
   determine that a light collision occurs when a light collision determination condition that at least one collision index value representing a level of a collision of the own vehicle is larger than a light collision determination threshold at which an airbag is not developed, is satisfied; and
   execute a secondary collision damage mitigation control to apply a braking force to the own vehicle or limit a driving force applied to the own vehicle when the electronic control unit determines that (i) the driver is in the drowsy state, and (ii) the light collision occurs.

2. The driving assist apparatus as set forth in claim 1, wherein:
the electronic control unit is configured to execute the secondary collision damage mitigation control when the electronic control unit determines that the light collision occurs until a predetermined amount of time elapses since the electronic control unit determines that the driver is not in the drowsy state.

3. The driving assist apparatus as set forth in claim 1, wherein:
the driving assist apparatus further comprises at least one rear monitor sensor which detects a state behind the own vehicle; and
the electronic control unit is configured to:
   determine whether there is a following vehicle moving behind the own vehicle in a predetermined area near the own vehicle, based on the state behind the own vehicle detected by the rear monitor sensor;
   apply the braking force to the own vehicle in executing the secondary collision damage mitigation control when the electronic control determines that there is not the following vehicle in the predetermined area near the own vehicle; and
   limit the driving force applied to the own vehicle without applying the braking force to the own vehicle in executing the secondary collision damage mitigation control when the electronic control determines that there is the following vehicle in the predetermined area near the own vehicle.

4. The driving assist apparatus as set forth in claim 3, wherein:
the predetermined area is set such that an inter-vehicle distance between the own vehicle and the following vehicle in the predetermined area is longer than or equal to a predetermined distance.

5. The driving assist apparatus as set forth in claim 4, wherein:
the predetermined distance is set to a distance which increases as a moving speed of the own vehicle increases.

6. The driving assist apparatus as set forth in claim 1, wherein:
the at least one collision index value includes at least one of (i) an acceleration of a body of the own vehicle and (ii) a value varying, depending on the acceleration.

7. The driving assist apparatus as set forth in claim 1, wherein:
the at least one collision index value includes at least one of (i) an acceleration of a body of the own vehicle and (ii) an integration value of the acceleration.

8. The driving assist apparatus as set forth in claim 1, wherein:
the at least one collision index value includes (i) an acceleration of a body of the own vehicle and (ii) an integration value of the acceleration.

9. The driving assist apparatus as set forth in claim 1, wherein:
the airbag is developed when the at least one collision index value is larger than an airbag development determination threshold; and
the light collision determination threshold is smaller than the airbag development determination threshold.

* * * * *